United States Patent
Luo et al.

(10) Patent No.: US 9,391,712 B2
(45) Date of Patent: Jul. 12, 2016

(54) UPSTREAM OPTICAL TRANSMISSION ASSIGNMENT BASED ON TRANSMISSION POWER

(71) Applicant: Futurewei Technologies, Inc., Plano, TX (US)

(72) Inventors: Yuanqiu Luo, Cranbury, NJ (US); Frank Effenberger, Colts Neck, NJ (US)

(73) Assignee: Futurewei Technologies, Inc., Plano, TX (US)

(*) Notice: Subject to any disclaimer, the term of this patent is extended or adjusted under 35 U.S.C. 154(b) by 103 days.

(21) Appl. No.: 14/305,218

(22) Filed: Jun. 16, 2014

(65) Prior Publication Data

US 2015/0365172 A1   Dec. 17, 2015

(51) Int. Cl.
| | |
|---|---|
| *H04B 10/572* | (2013.01) |
| *H04J 14/02* | (2006.01) |
| *H04B 10/564* | (2013.01) |
| *H04B 10/40* | (2013.01) |

(Continued)

(52) U.S. Cl.
CPC .......... *H04B 10/564* (2013.01); *H04B 10/2507* (2013.01); *H04B 10/40* (2013.01); *H04B 10/572* (2013.01); *H04J 14/025* (2013.01); *H04J 14/0227* (2013.01); *H04J 14/08* (2013.01)

(58) Field of Classification Search
CPC ..................... H04B 10/2507; H04B 10/07955; H04J 14/0236; H04J 14/0252; H04J 14/0263; H04J 14/0265; H04J 14/086; H04Q 11/0414; H04Q 2011/0064
See application file for complete search history.

(56) References Cited

U.S. PATENT DOCUMENTS

| | | | | |
|---|---|---|---|---|
| 6,661,974 | B1 * | 12/2003 | Akiyama | H04B 10/2513 398/158 |
| 2005/0244161 | A1 * | 11/2005 | Satoh | H04J 14/0227 398/85 |
| 2008/0166127 | A1 * | 7/2008 | Kazawa | H04J 14/025 398/79 |

(Continued)

FOREIGN PATENT DOCUMENTS

| | | |
|---|---|---|
| CN | 101309097 A | 11/2008 |
| WO | 2013062359 A | 5/2013 |
| WO | 2013066520 A1 | 5/2013 |

OTHER PUBLICATIONS

Partial English Translation and Abstract of Chinese Patent Application No. CN101309097, Oct. 21, 2015, 3 pages.

(Continued)

*Primary Examiner* — Li Liu
(74) *Attorney, Agent, or Firm* — Conley Rose, P.C.; Grant Rodolph; Jonathan K. Polk

(57) ABSTRACT

An apparatus comprises a receiver configured to receive first messages, a processor coupled to the receiver and configured to process the first messages, determine transmission powers associated with the first messages, and generate a transmission scheme based on the transmission powers, and a transmitter coupled to the processor and configured to transmit a second message comprising the transmission scheme. An apparatus comprises a transmitter configured to transmit a first message indicating a transmission power of the apparatus, a receiver configured to receive a second message, wherein the second message assigns to the apparatus a wavelength based on the transmission power, and a processor coupled to the transmitter and the receiver and configured to process the second message, and instruct the transmitter to transmit a third message at the wavelength.

19 Claims, 8 Drawing Sheets

(51) Int. Cl.
*H04J 14/08* (2006.01)
*H04B 10/2507* (2013.01)

(56) References Cited

U.S. PATENT DOCUMENTS

| | | | | |
|---|---|---|---|---|
| 2011/0200328 A1* | 8/2011 | In De Betou | .......... | H04L 5/0003 398/38 |
| 2011/0255866 A1* | 10/2011 | Van Veen | .......... | H04B 10/07955 398/35 |
| 2011/0274439 A1* | 11/2011 | Sarlet | .......... | H04J 14/0256 398/158 |
| 2012/0014693 A1* | 1/2012 | Cheng | .......... | H04J 14/0282 398/34 |
| 2012/0195593 A1* | 8/2012 | Bernasconi | .......... | H04B 10/506 398/48 |
| 2013/0004172 A1* | 1/2013 | Sugawa | .......... | H04J 3/1694 398/72 |
| 2013/0034356 A1* | 2/2013 | Luo | .......... | H04B 10/272 398/72 |
| 2013/0094861 A1* | 4/2013 | Luo | .......... | H04J 14/0278 398/68 |
| 2013/0094862 A1* | 4/2013 | Luo | .......... | H04J 14/0278 398/68 |
| 2015/0037029 A1* | 2/2015 | Waldman | .......... | H04Q 11/0005 398/48 |

OTHER PUBLICATIONS

Foreign Communication From A Counterpart Application, PCT Application No. PCT/CN2015/081286, International Search Report dated Sep. 22, 2015, 7 pages.

Foreign Communication From A Counterpart Application, PCT Application No. PCT/CN2015/081286, International Search Report dated Sep. 22, 2015, 4 pages.

"Series G: Transmission Systems and Media, Digital Systems and Networks—Digital Sections and Digital Line System—Optical Line Systems for Local and Access Networks—Phoneline Networking Transceivers—Payload Format and Link Layer Requirements," ITU-T Telecommunication Standardization Sector of ITU, G.989.2, Nov. 2001, 66 pages.

* cited by examiner

UPSTREAM OPTICAL TRANSMISSION ASSIGNMENT BASED ON TRANSMISSION POWER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mbps).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT.

Next-generation PONs may combine TDMA and WDMA to support higher capacity so that an increased number of users can be served by a single OLT with sufficient bandwidth per user. In such a time- and wavelength-division multiplexing (TWDM) PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an apparatus comprising a receiver configured to receive first messages, a processor coupled to the receiver and configured to process the first messages, determine transmission powers associated with the first messages, and generate a transmission scheme based on the transmission powers, and a transmitter coupled to the processor and configured to transmit a second message comprising the transmission scheme.

In another embodiment, the disclosure includes an apparatus comprising a transmitter configured to transmit a first message indicating a transmission power of the apparatus, a receiver configured to receive a second message, wherein the second message assigns to the apparatus a wavelength based on the transmission power, and a processor coupled to the transmitter and the receiver and configured to process the second message, and instruct the transmitter to transmit a third message at the wavelength.

In yet another embodiment, the disclosure includes a method comprising receiving first messages, processing the first messages, determining transmission powers associated with each of the first messages, generating a transmission scheme based on the transmission powers, and transmitting a second message comprising the transmission scheme.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In time- and wavelength-division multiplexing (TWDM) passive optical networks (PONs), each port of an optical line terminal (OLT) may essentially be a 10-gigabit-per-second (10 Gb/s) PON (10G-PON or XG-PON) running a pair of channels: one downstream wavelength channel and one upstream wavelength channel. A TWDM PON may have at least four such pairs of wavelength channels. Downstream may refer to the direction from the OLT to optical network units (ONUs), and upstream may refer to the direction from the ONUs to the OLT. One upstream wavelength channel and its signals may interfere with the other upstream wavelength channels and their signals. This phenomenon may be referred to as out-of-channel optical power spectrum density, or crosstalk. International Telecommunication Union Telecommunication Standardization Sector (ITU-T) G.989.2 (November 2001), which is incorporated by reference, as well as its successors, may specify a maximum for upstream crosstalk. It is therefore important to design solutions to reduce upstream crosstalk to at least that maximum.

One approach to reduce upstream crosstalk is through optimized upstream transmission scheduling. Current scheduling approaches focus on time domain assignment and traffic load considerations. Another approach is to assign upstream transmissions on a first-come, first-served basis. As PONs accommodate wavelength-division multiplexing (WDM) and additional ONUs, upstream crosstalk may increase, and those approaches may not effectively address that increase. Furthermore, current approaches do not reduce upstream crosstalk using protocol layer schemes.

Disclosed herein are embodiments for reducing upstream crosstalk using protocol layer schemes. In particular, upstream transmissions from ONUs may be assigned based on ONU transmission powers. The assignments may dictate the wavelengths that ONUs transmit at and may also optionally dictate the time at which those ONUs transmit. The assignments may be referred to as a cross-layer scheme because the media access control (MAC) layer may instruct the physical layer how to assign upstream transmissions. The MAC layer and the physical layer, which are logical layers, are described, but other logical layers may be used as well. The embodiments may apply to any networks employing multiple wavelengths.

Figure 1:
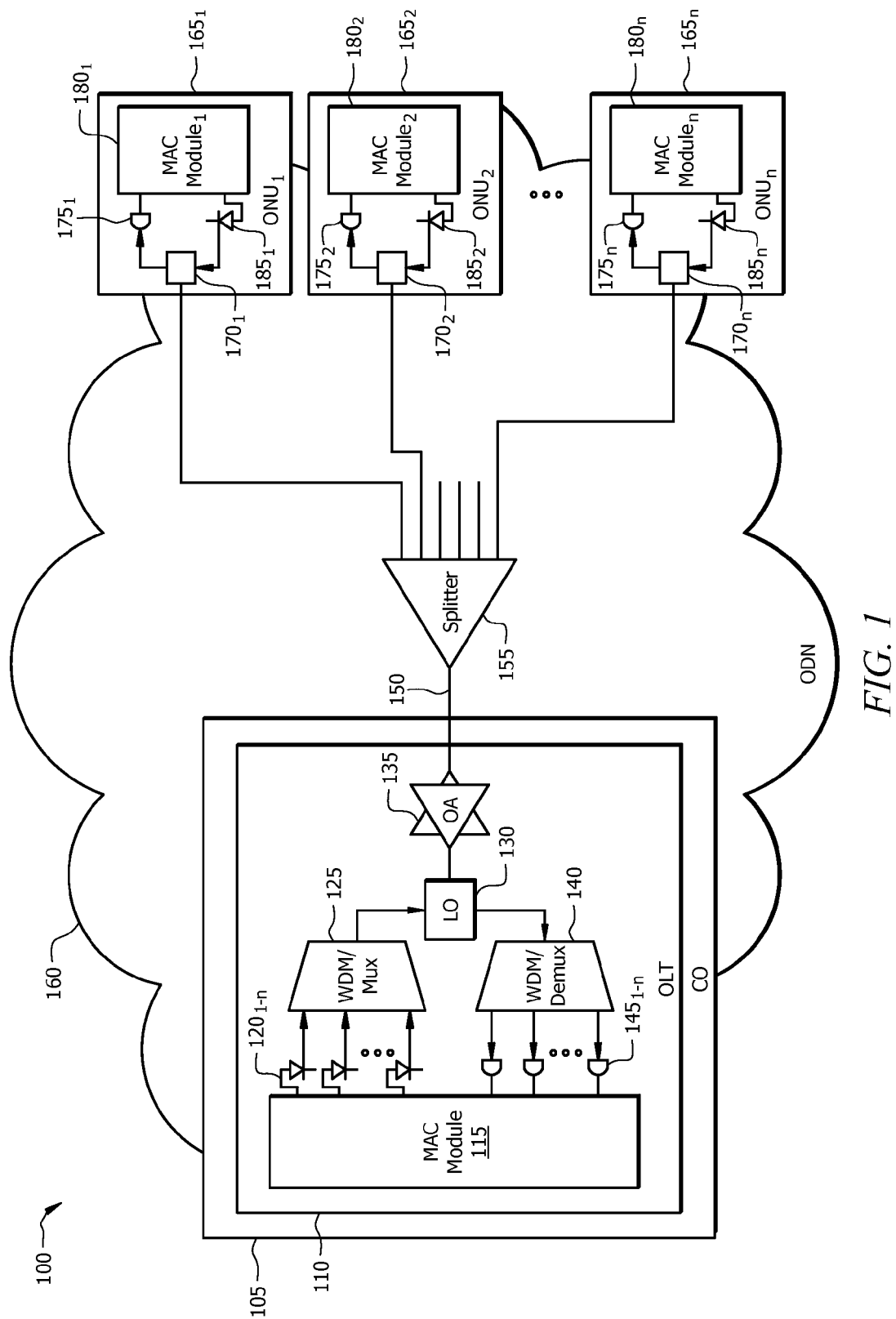
FIG. 1 is a schematic diagram of a passive optical network (PON) according to an embodiment of the disclosure.

FIG. 1 is a schematic diagram of a PON 100 according to an embodiment of the disclosure. The PON 100 may be suitable for implementing the disclosed embodiments. The PON 100 may comprise an OLT 110 located in a central office (CO) 105, $ONUs_1$, $165_{1-n}$ located at the customer premises, and an optical distribution network (ODN) 160 that couples the OLT 110 to the $ONUs_{1-n}$ $165_{1-n}$, where N may be any positive integer. The PON 100 may provide WDM capability by associating a downstream wavelength with each $transmitter_{1-n}$ $124_{1-n}$ and an upstream wavelength with each $receiver_{1-n}$ $145_{1-n}$ in the OLT 110 so that a plurality of wavelengths is present, then combining those wavelengths into a single optical fiber cable 150 and distributing the wavelengths to the $ONUs_{1-n}$ $165_{1-n}$ through a splitter 155. The PON 100 may provide time-division multiplexing (TDM) as well.

The PON 100 may be a communications network that does not require any active components to distribute data between the OLT 110 and the $ONUs_{1-n}$ $165_{1-n}$. Instead, the PON 100 may use passive optical components in the ODN 160 to distribute data between the OLT 110 and the $ONUs_{1-n}$ $165_{1-n}$. The PON 100 may adhere to any standard related to multiple-wavelength PONs.

The CO 105 may be a physical building and may comprise servers and other backbone equipment designed to service a geographical area with data transfer capability. The CO 105 may comprise the OLT 110, as well as additional OLTs. If multiple OLTs are present, than any suitable access scheme may be used among them.

The OLT 110 may be any device configured to communicate with the $ONUs_{1-n}$ $165_{1-n}$ and another network. Specifically, the OLT 110 may act as an intermediary between the other network and the $ONUs_{1-n}$ $165_{1-n}$. For instance, the OLT 110 may forward data received from the network to the $ONUs_{1-n}$ $165_{1-n}$ and may forward data received from the $ONUs_{1-n}$ $165_{1-n}$ to the other network. When the other network uses a network protocol that differs from the PON protocol used in the PON 100, the OLT 110 may comprise a converter that converts the network protocol to the PON protocol. The OLT 110 converter may also convert the PON protocol into the network protocol. Though the OLT 110 is shown as being located at the CO 105, the OLT 110 may be located at other locations as well. In an embodiment, the OLT 110 may comprise an MAC module 115, $transmitters_{1-n}$ $120_{1-n}$, a WDM/mux 125, a local oscillator (LO) 130, a bi-directional optical amplifier (OA) 135, a WDM/demux 140, and $receivers_{1-n}$ $145_{1-n}$ coupled together as shown in FIG. 1.

The MAC module 115 may be any module suitable for processing signals for use at a physical layer in a protocol stack. Specifically, the MAC module may process the signals using channel access control mechanisms, which are described below. After processing the signals, the MAC module may instruct the $transmitters_{1-n}$ $120_{1-n}$ to transmit those signals. The $transmitters_{1-n}$ $120_{1-n}$ may comprise tunable lasers or other devices suitable for converting electrical signals into optical signals and transmitting the optical signals on separate wavelength channels to the WDM/mux 125. The WDM/mux 125 may be any suitable wavelength multiplexer, such as an arrayed waveguide grating (AWG). The WDM/mux 125 may multiplex the wavelength channels and thus combine the signals into a combined transmitted signal, then forward the combined transmitted signal to the LO 130. The LO 130 may add characteristics to the combine transmitted signal in order for the $ONUs_{1-n}$ $165_{1-n}$ to properly extract the signals. The LO 130 may then forward the combined transmitted signal to the OA 135, which may amplify the combined transmitted signal as needed in order to forward the combined transmitted signal to a splitter 155. The OA 135 may also receive a combined received signal from the splitter 155 and amplify the combined received signal as needed in order to forward the combined received signal to the WDM/demux 140. The WDM/demux 140 may be similar to the WDM/mux 125 and may demultiplex the combined received signal into multiple optical signals, then forward the multiple optical signals to the $receivers_{1-n}$ $145_{1-n}$. The $receivers_{1-n}$ $145_{1-n}$ may comprise photodiodes or other devices suitable for converting optical signals into electrical signals and forwarding the electrical signals to the MAC module 115 for further processing.

The splitter 155 may be any device suitable for splitting the combined optical signals and forwarding the split signals to the $ONUs_{1-n}$ $165_{1-n}$. The splitter 155 may be an active splitter or a passive splitter. The splitter 155 may be located at a remote node or closer to the CO 105 as needed.

The ODN 160 may be any suitable data distribution system, which may comprise optical fiber cables such as the optical fiber cable 150, couplers, splitters, distributors, or other equipment. The optical fiber cables, couplers, splitters, distributors, or other equipment may be passive optical components and therefore not require any power to distribute data signals between the OLTs 110 and the $ONUs_{1-n}$ $165_{1-n}$. Alternatively, the ODN 160 may comprise one or more active components such as optical amplifiers or a splitter such as the splitter 155. The ODN 160 may typically extend from the OLTs 110 to the $ONUs_{1-n}$ $165_{1-n}$, in a branching configuration as shown in FIG. 1, but the ODN 160 may be configured in any suitable point-to-multipoint (P2MP) configuration.

The $ONUs_{1-n}$ $165_{1-n}$ may be any devices suitable for communicating with the OLT 110 and a customer. Specifically, the $ONUs_{1-n}$ $165_{1-n}$ may act as an intermediary between the OLT 110 and the customer. For instance, the $ONUs_{1-n}$ $165_{1-n}$ may forward data received from the OLT 110 to the customer and forward data received from the customer to the OLT 110. The $ONUs_{1-n}$ $165_{1-n}$ may be similar to optical network terminals (ONTs), so the terms may be used interchangeably. The $ONUs_{1-n}$ $165_{1-n}$ may typically be located at distributed locations such as the customer premises, but may be located at other locations as well. The $ONUs_{1-n}$ $165_{1-n}$ may comprise $diplexers_{1-n}$ $170_{1-n}$, $receivers_{1-n}$ $175_{1-n}$, MAC $modules_{1-n}$ $180_{1-n}$, and $transmitters_{1-n}$ $185_{1-n}$ coupled together as shown in FIG. 1. The $diplexers_{1-n}$ $170_{1-n}$ may forward the downstream signals from the splitter 155 to the $receivers_{1-n}$ $175_{1-n}$ and forward upstream signals from the $transmitters_{1-n}$ $185_{1-n}$ to the splitter 155. The $receivers_{1-n}$ $175_{1-n}$, the MAC $modules_{1-n}$ $180_{1-n}$, and the $transmitters_{1-n}$ $185_{1-n}$ may function in a manner similar to the $receivers_{1-n}$ $145_{1-n}$, the MAC module 115, and the $transmitters_{1-n}$ $120_{1-n}$ in the OLT 110, respectively.

Figure 2:
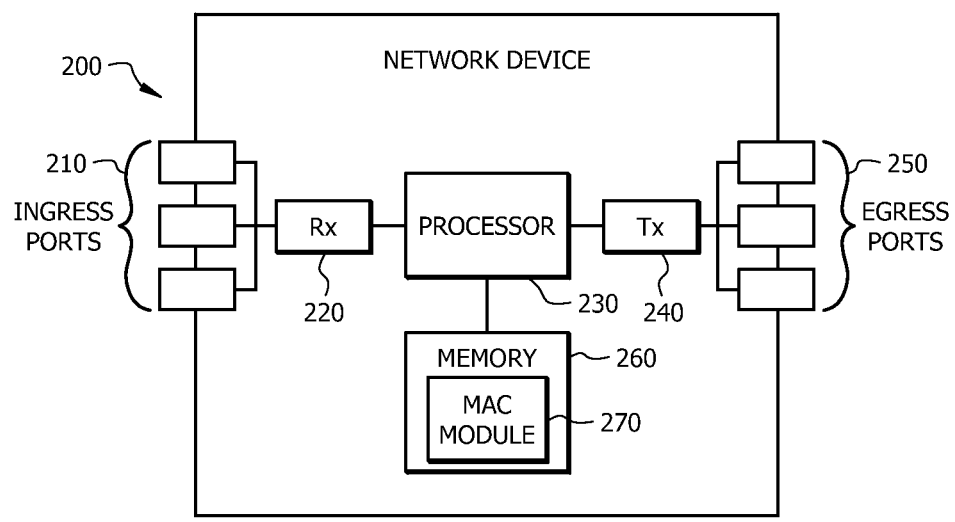
FIG. 2 is a schematic diagram of a network device according to an embodiment of the disclosure.

FIG. 2 is a schematic diagram of a network device 200. The network device 200 may be suitable for implementing the disclosed embodiments. The network device 200 may comprise ingress ports 210 and receiver units (Rx) 220 for receiving data; a processor, logic unit, or central processing unit (CPU) 230 to process the data; transmitter units (Tx) 240 and egress ports 250 for transmitting the data; and a memory 260 for storing the data. The network device 200 may also comprise optical-to-electrical (OTE) components and electrical-to-optical (ETO) components coupled to the ingress ports 210, receiver units 220, transmitter units 240, and egress ports 250 for egress or ingress of optical or electrical signals.

The processor 230 may be implemented by hardware and software. The processor 230 may be in communication with the ingress ports 210, the receiver units 220, the transmitter units 240, the egress ports 250, and the memory 260. The processor 230 may be implemented as one or more CPU chips, cores (e.g., as a multi-core processor), field-programmable gate arrays (FPGAs), application specific integrated circuits (ASICs), and digital signal processors (DSPs).

The memory 260 may comprise one or more disks, tape drives, and solid-state drives; may be used as an over-flow data storage device; may be used to store programs when such programs are selected for execution; and may be used to store instructions and data that are read during program execution. The memory 260 may be volatile and non-volatile and may be read-only memory (ROM), random-access memory (RAM), ternary content-addressable memory (TCAM), and static random-access memory (SRAM). The memory 260 may comprise an MAC module 270, which may be suitable for implementing the MAC module 115 and the MAC $modules_{1-n}$ $180_{1-n}$.

Figure 3:
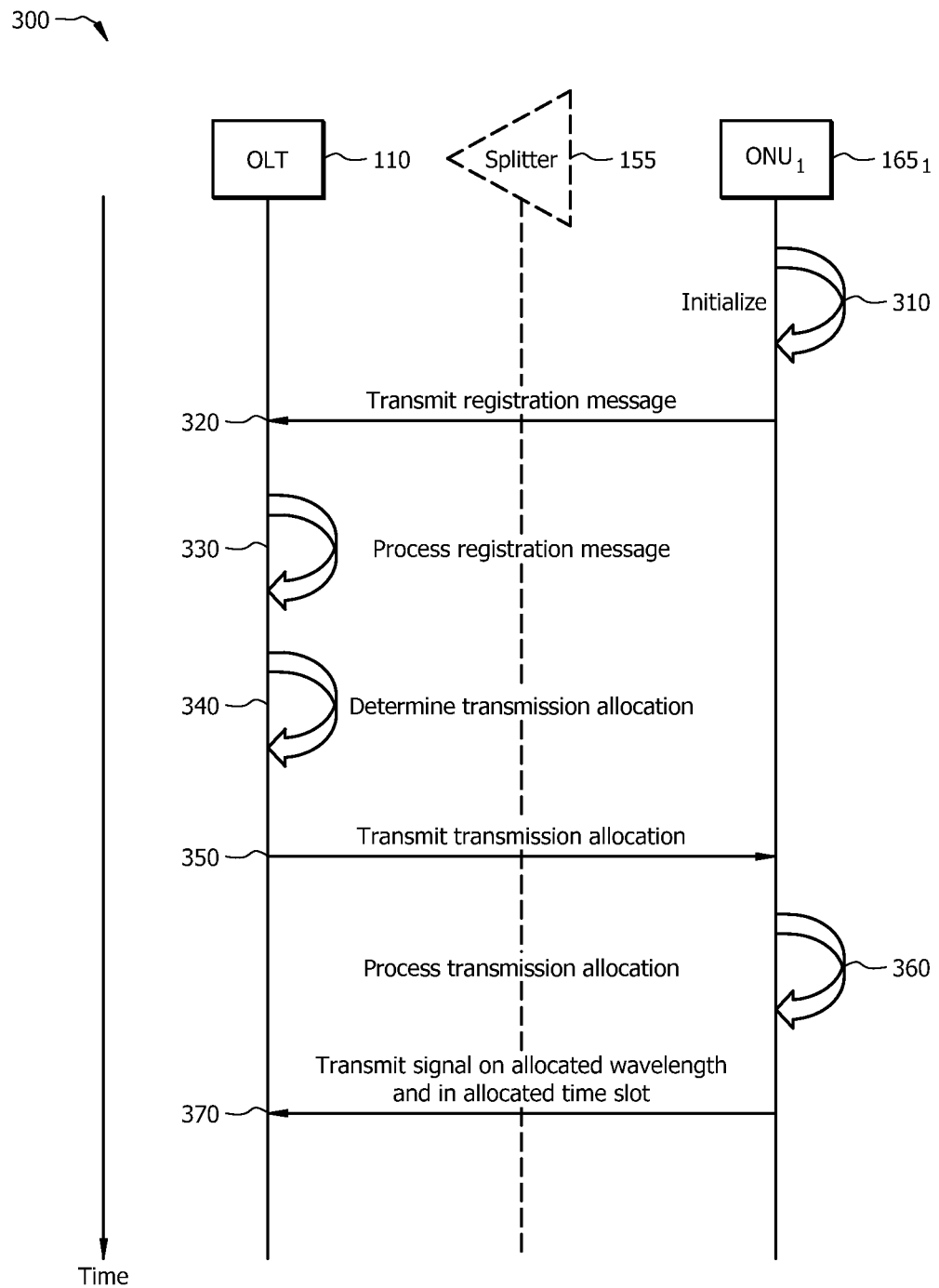
FIG. 3 is a message sequence diagram illustrating transmission allocation according to an embodiment of the disclosure.

FIG. 3 is a message sequence diagram 300 illustrating transmission allocation according to an embodiment of the disclosure. The PON 100 may implement the allocation. The diagram illustrates messages exchanges between the OLT 110 and the $ONU_1$ $165_1$, but the same principles may apply between the OLT 110 and any other $ONU_{2-n}$ $165_{2-n}$.

At step 310, the $ONU_1$ $165_1$ may initialize. Initialization may comprise self-configuration and ranging to the OLT 110. This may occur, for instance, when a customer turns on the $ONU_1$ $165_1$. At step 320, the $ONU_1$ $165_1$ may transmit a registration message to the OLT 110. The registration message may indicate a request for the $ONU_1$ $165_1$ to transmit and receive signals. The $ONU_1$ $165_1$ may be designed to transmit registration messages on a specified registration wavelength. The registration message may further indicate a transmission power of the $ONU_1$ $165_1$.

At step 330, the OLT 110 may process the registration message. The processing may include processing the request for the $ONU_1$ $165_1$ to transmit and receive signals and may include processing the transmission power of the $ONU_1$ $165_1$. Alternatively, the OLT 110 may calculate the power of the signal that it receives from the $ONU_1$ $165_1$. At step 340, the OLT 110 may determine transmission allocation for the $ONU_1$ $165_1$. For instance, the transmission allocation may assign downstream reception and upstream transmission wavelengths and time slots to the $ONU_1$ $165_1$. At step 350, the OLT 110 may transmit a transmission allocation to the $ONU_1$ $165_1$.

At step 360, the $ONU_1$ $165_1$ may process the transmission allocation. Based on the transmission allocation, the $ONU_1$ $165_1$ may determine what wavelengths it is to receive and transmit signals at and what time slots it is to receive and transmit signals in. At step 370, the $ONU_1$ $165_1$ may transmit a signal on its allocated wavelength and in its allocated time slot. The steps above are described with respect to the OLT 110 and the $ONU_1$ $165_1$, but any signals exchanged between the OLT 110 and the $ONU_1$ $165_1$ may pass through the splitter 155 as shown in FIG. 3, as well as other components of the PON 100 as described with respect to FIG. 1 above. The disclosed embodiments may more fully describe the steps above, including step 340.

In a first embodiment, the OLT 110 may collect the transmission power of the $ONUs_{1-n}$ $165_{1-n}$ and divide the $ONUs_{1-n}$ $165_{1-n}$ into m groups based on those transmission powers. M may be any positive integer equal to or less than n and may be associated with upstream wavelengths. The OLT 110 may determine m in any suitable manner. The m groups may or may not have an equal number of $ONUs_{1-n}$ $165_{1-n}$. For instance, the OLT 110 may determine m ranges of $ONU_{1-n}$ $165_{1-n}$ transmission powers, then group the $ONUs_{1-n}$ $165_{1-n}$ in the ranges that apply to them. Alternatively, the OLT 110 may order the $ONUs_{1-n}$ $165_{1-n}$ according to their transmission powers, then group the $ONUs_{1-n}$ $165_{1-n}$ in m groups of an arbitrary number of $ONUs_{1-n}$ $165_{1-n}$. Alternatively, the OLT 110 may group the $ONU_{1-n}$ $165_{1-n}$ in any other suitable manner. If m is less than the number of available wavelengths, in other words, if some wavelengths are idle, then the shortest and longest wavelengths may be assigned while the idle wavelengths may be intermediate-length wavelengths.

After determining the m groups, the OLT 110 may assign a shortest-length upstream wavelength to the $ONU_{1-n}$ $165_{1-n}$ group with the strongest transmission power, a longest-length upstream wavelength to the $ONU_{1-n}$ $165_{1-n}$ group with the weakest transmission power, and m−2 intermediate-length upstream wavelengths to the remaining $ONU_{1-n}$ $165_{1-n}$ groups. Alternatively, the OLT 110 may assign a shortest-length upstream wavelength to the $ONU_{1-n}$ $165_{1-n}$ group with the weakest transmission power, a longest-length upstream wavelength to the $ONU_{1-n}$ $165_{1-n}$ group with the strongest transmission power, and m−2 intermediate-length upstream wavelengths to the remaining $ONU_{1-n}$ $165_{1-n}$ groups. Alternatively, the OLT 110 may assign upstream wavelengths to the $ONUs_{1-n}$ $165_{1-n}$, in any way that wavelength separates $ONUs_{1-n}$ $165_{1-n}$ with stronger transmission powers from $ONUs_{1-n}$ $165_{1-n}$ with weaker transmission powers. The terms "strongest" and "weakest" may be relative terms used to describe the transmission powers of the $ONUs_{1-n}$ $165_{1-n}$, in relation to each other.

By assigning upstream wavelengths as described, the $ONUs_{1-n}$ $165_{1-n}$ with the strongest transmission powers, and thus the most potential to interfere with other $ONUs_{1-n}$ $165_{1-n}$, may be wavelength separated from the $ONUs_{1-n}$ $165_{1-n}$ with the weakest transmission powers. These assignments may naturally reduce crosstalk among the $ONUs_{1-n}$ $165_{1-n}$. Meanwhile, the $ONUs_{1-n}$ $165_{1-n}$ with similar transmission powers may be proximate in wavelength to each other. Such proximity may not significantly increase crosstalk.

Though the OLT 110 is described as performing the assignments, other PON 100 components may do so as well. The design of the OLT 110, specifically the WDM/mux 125 and the WDM/demux 140, may determine which wavelengths are available. The design of the $ONUs_{1-n}$ $165_{1-n}$ specifically the design of the $transmitters_{1-n}$ $185_{1-n}$, may determine the transmission powers.

Figure 4:
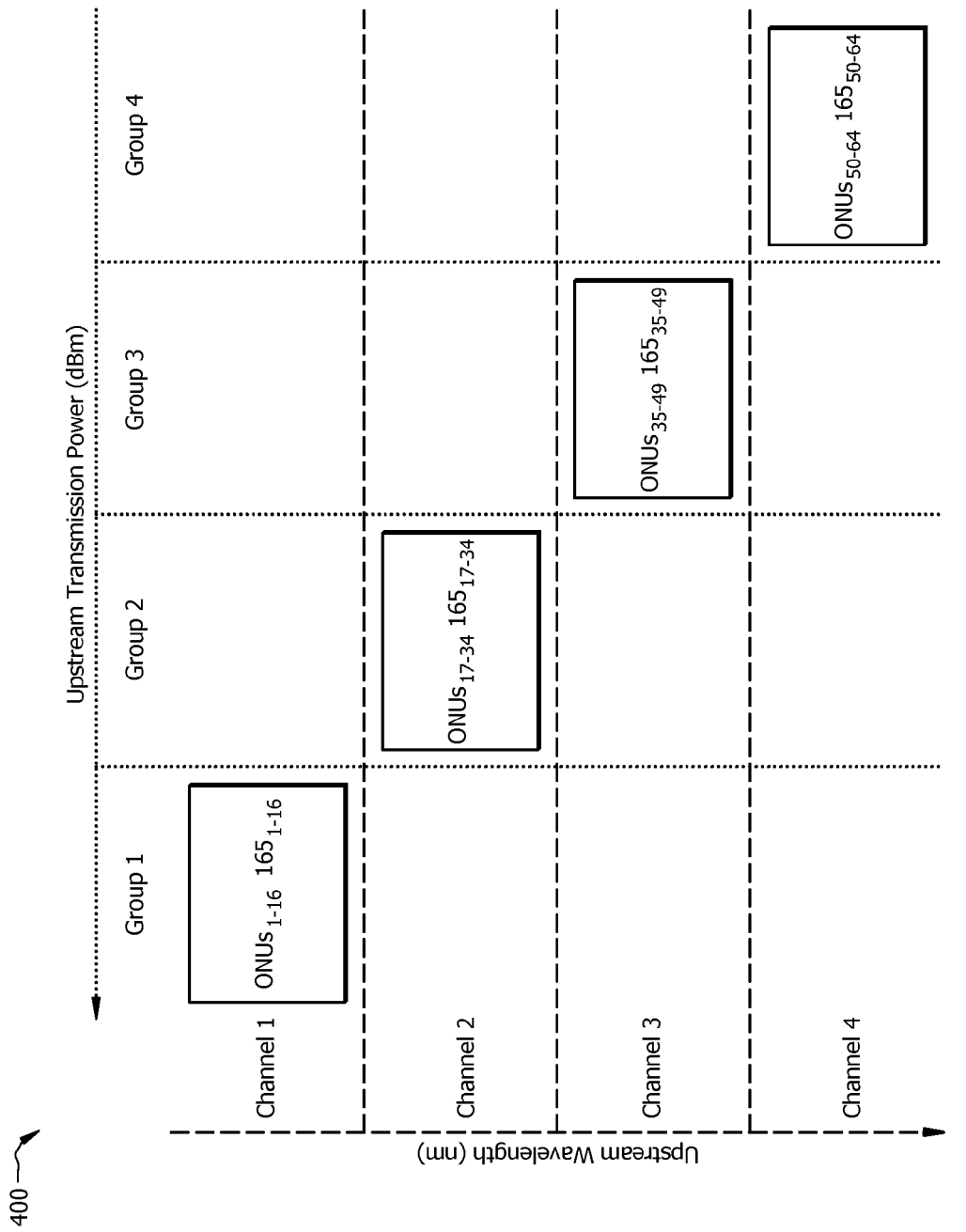
FIG. 4 is a diagram illustrating a scheme for upstream transmission allocation according to an embodiment of the disclosure.

FIG. 4 is a diagram illustrating a scheme 400 for upstream transmission allocation according to an embodiment of the disclosure. The scheme 400 may demonstrate wavelength-division multiple access (WDMA). The scheme 400 may show 64 $ONUs_{1-n}$ $165_{1-n}$, $ONUs_{1-64}$ $165_{1-64}$, grouped into four groups, groups 1-4, according to upstream transmission power. In that case, n is 64 and m is 4. Each group of $ONUs_{1-64}$ $165_{1-64}$ may be assigned an upstream wavelength associated with one of four wavelength channels, channels 1-4. The upstream transmission powers are in decibels-milliwatts (dBm) and increase to the left horizontally. The upstream wavelengths are in nanometers (nm) and increase to the bottom vertically. The scheme 400 may assign a shortest-length wavelength to the $ONU_{1-n}$ $165_{1-n}$ group with the strongest transmission powers, a longest-length wavelength to the $ONU_{1-n}$ $165_{1-n}$ group with the weakest transmission powers, and so forth.

As shown, the $ONUs_{1-16}$ $165_{1-16}$ comprising group 1 may have the strongest transmission powers and may therefore be assigned a first wavelength channel that may correspond to the shortest-length wavelength available. The $ONUs_{17-34}$ $165_{17-34}$ comprising group 2 may have the second-strongest transmission powers and may therefore be assigned a second wavelength channel that may correspond to the second-shortest-length wavelength available. The $ONUs_{35-49}$ $165_{35-49}$ comprising group 3 may have the third-strongest transmission powers and may therefore be assigned a third wavelength channel that may correspond to the third-shortest-length wavelength available. Finally, the $ONUs_{50-64}$ $165_{50-64}$ comprising group 4 may have the weakest transmission powers and may therefore be assigned a fourth wavelength channel that may correspond to the longest-length wavelength available. Because the $ONUs_{1-16}$ $165_{1-16}$ with the strongest transmission powers transmit in the first wavelength channel and the $ONUs_{50-64}$ $165_{50-64}$ with the weakest transmission powers transmit in the fourth wavelength channel, which is farthest from the first wavelength channel, crosstalk among the $ONUs_{1-64}$ $165_{1-64}$ may be reduced.

Figure 5:
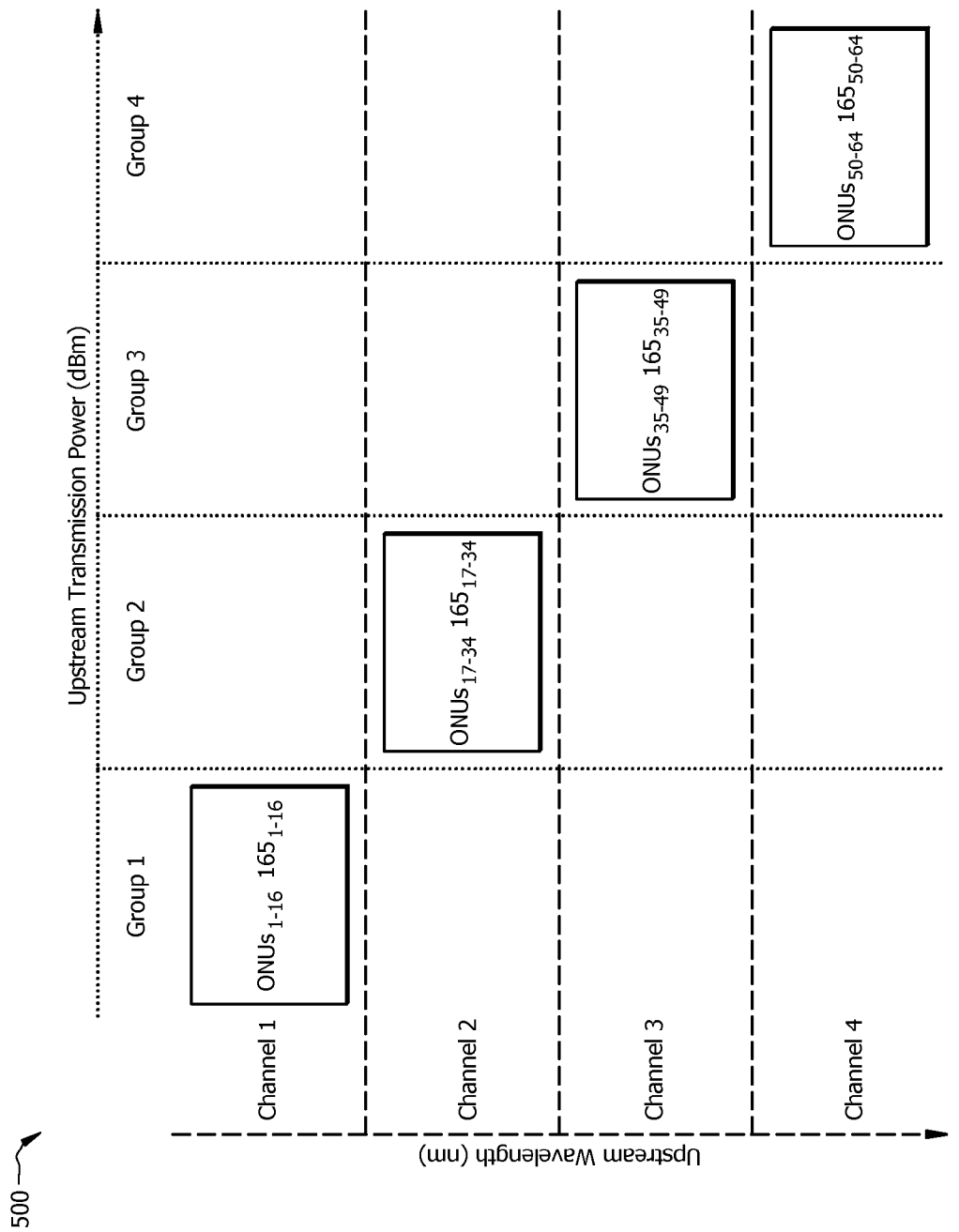
FIG. 5 is a diagram illustrating a scheme for upstream transmission allocation according to another embodiment of the disclosure.

FIG. 5 is a diagram illustrating a scheme 500 for upstream transmission allocation according to another embodiment of the disclosure. The scheme 500 may demonstrate WDMA. The scheme 500 may show 64 $ONUs_{1-n}$ $165_{1-n}$ $ONUs_{1-64}$ $165_{1-64}$, grouped into four groups, groups 1-4, according to upstream transmission power. In that case, n is 64 and m is 4. Each group of $ONUs_{1-64}$ $165_{1-64}$ may be assigned an upstream wavelength associated with one of four wavelength channels, channels 1-4. The upstream transmission powers are in dBm and increase to the right horizontally. The upstream wavelengths are in nanometers and increase to the bottom vertically. The scheme 500 may assign a shortest-length wavelength to the $ONU_{1-n}$ $165_{1-n}$ group with the weakest transmission powers, a longest-length wavelength to the $ONU_{1-n}$ $165_{1-n}$ group with the strongest transmission powers, and so forth.

As shown, the $ONUs_{1-16}$ $165_{1-16}$ comprising group 1 may have the weakest transmission powers and may therefore be assigned a first wavelength channel that may correspond to the shortest-length wavelength available. The $ONUs_{17-34}$ $165_{17-34}$ comprising group 2 may have the second-weakest transmission powers and may therefore be assigned a second wavelength channel that may correspond to the second-shortest-length wavelength available. The $ONUs_{35-49}$ $165_{35-49}$ comprising group 3 may have the third-weakest transmission powers and may therefore be assigned a third wavelength channel that may correspond to the third-shortest-length wavelength available. Finally, the $ONUs_{50-64}$ $165_{50-64}$ comprising group 4 may have the strongest transmission powers and may therefore be assigned a fourth wavelength channel that may correspond to the longest-length wavelength available. Because the $ONUs_{1-16}$ $165_{1-16}$ with the weakest transmission powers transmit in the first wavelength channel and the $ONUs_{50-64}$ $165_{50-64}$ with the strongest transmission powers transmit in the fourth wavelength channel, which is farthest from the first wavelength channel, crosstalk among the $ONUs_{1-64}$ $165_{1-64}$ may be reduced.

Figure 6:
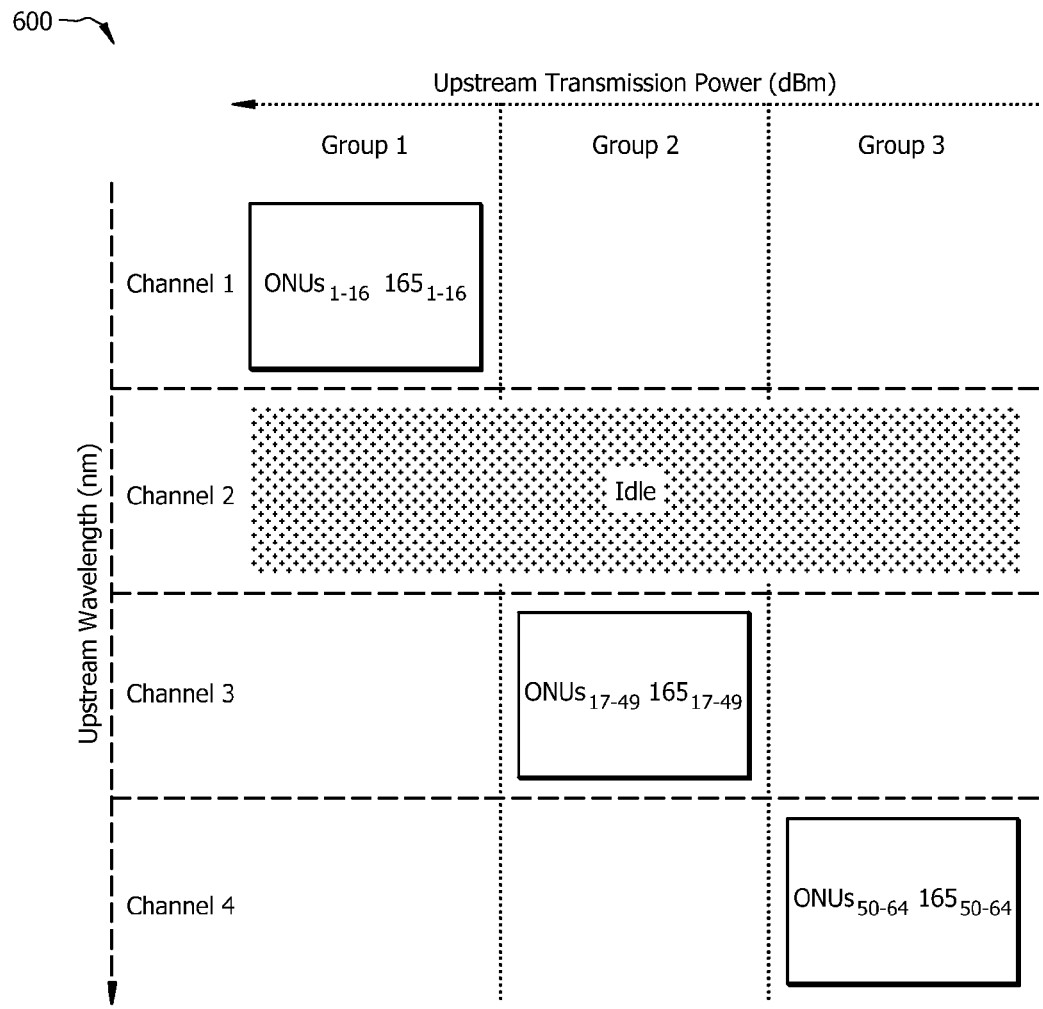
FIG. 6 is a diagram illustrating a scheme for upstream transmission allocation according to yet another embodiment of the disclosure.

FIG. 6 is a diagram illustrating a scheme 600 for upstream transmission allocation according to yet another embodiment of the disclosure. The scheme 600 may demonstrate WDMA and may be similar to the scheme 400, but also account for an idle wavelength channel. The scheme 600 may show 64 $ONUs_{1-n}$ $165_{1-n}$, $ONUs_{1-64}$ $165_{1-64}$, grouped into three groups, groups 1-3, according to upstream transmission power. In that case, n is 64 and m is 3. Each group of $ONUs_{1-64}$ $165_{1-64}$ may be assigned an upstream wavelength associated with one of three wavelength channels, channels 1 and 3-4. Because there are three groups of $ONUs_{1-n}$ $165_{1-n}$ yet four available channels, channel 2 may be idle. The upstream transmission powers are in dBm and increase to the left horizontally. The upstream wavelengths are in nanometers and increase to the bottom vertically. The scheme 600 may assign a shortest-length wavelength to the $ONU_{1-n}$ $165_{1-n}$ group with the strongest transmission powers, a longest-length wavelength to the $ONU_{1-n}$ $165_{1-n}$ group with the weakest transmission power, and so forth, as well as account for the idle channel 2. The shortest-length wavelength and the longest-length wavelength may be used, but the designation of channel 2 as the idle channel may be arbitrary.

As shown, the $ONUs_{1-16}$ $165_{1-16}$ comprising group 1 may have the strongest transmission powers and may therefore be assigned a first wavelength channel that may correspond to the shortest-length wavelength available. A second wavelength channel that may correspond to the second-shortest-length wavelength available may be idle. The $ONUs_{17-49}$ $165_{17-49}$ comprising group 2 may have the second-strongest transmission powers and may therefore be assigned a third wavelength channel that may correspond to the third-shortest-length wavelength available. Finally, the $ONUs_{50-64}$ $165_{50-64}$ comprising group 3 may have the weakest transmission powers and may therefore be assigned a fourth wavelength channel that may correspond to the longest-length wavelength available. Because the $ONUs_{1-16}$ $165_{1-16}$ with the strongest transmission powers transmit in the first wavelength channel and the $ONUs_{50-64}$ $165_{50-64}$ with the weakest transmission powers transmit in the fourth wavelength channel, which is farthest from the first wavelength channel, crosstalk among the $ONUs_{1-64}$ $165_{1-64}$ may be reduced.

In a second embodiment, the OLT 110 may assign wavelengths as described above, but also assign upstream transmission time slots based on upstream transmission power. The OLT 110 may already implement time-division multiple access (TDMA) to assign different upstream transmission time slots to $ONUs_{1-n}$ $165_{1-n}$ that transmit at the same wavelength and therefore avoid upstream transmission collisions in a wavelength channel corresponding to that wavelength. In addition, the OLT 110 may assign upstream transmission time slots based on upstream transmission power. Such assignment may be similar to the assignment described above. For instance, the OLT 110 may assign a first or earliest time slot to the $ONU_{1-n}$ $165_{1-n}$ group with the strongest transmission powers, a last or latest time slot to the $ONU_{1-n}$ $165_{1-n}$ group with the weakest transmission powers, and m−2 other or intermediate-time time slots to the remaining $ONUs_{1-n}$ $165_{1-n}$, groups. Alternatively, the OLT 110 may assign a first or earliest time slot to the $ONU_{1-n}$ $165_{1-n}$ group with the weakest transmission powers, a last or latest time slot to the $ONU_{1-n}$ $165_{1-n}$ group with the strongest transmission powers, and m−2 other or intermediate-time time slots to the remaining $ONUs_{1-n}$ $165_{1-n}$ groups. Alternatively, the OLT 110 may assign time slots to the $ONUs_{1-n}$ $165_{1-n}$, in any way that temporally separates $ONUs_{1-n}$ $165_{1-n}$, with stronger transmission powers from $ONUs_{1-n}$ $165_{1-n}$ with weaker transmission powers. In other words, the OLT 110 may assign time slots to the $ONUs_1$ $165_{1-n}$ so that the $ONUs_{1-n}$ $165_{1-n}$, with stronger transmission powers transmit at time slots that do not overlap with the time slots that the $ONUs_{1-n}$ $165_{1-n}$ with weaker transmission powers transmit at.

By assigning time slots as described, the $ONUs_{1-n}$ $165_{1-n}$ with the strongest transmission powers, and thus the most potential to interfere with other $ONUs_{1-n}$ $165_{1-n}$, may be temporally separated from the $ONUs_{1-n}$ $165_{1-n}$ with the weakest transmission powers. These assignments may naturally reduce crosstalk among the $ONUs_{1-n}$ $165_{1-n}$. Meanwhile, the $ONUs_{1-n}$ $165_{1-n}$ with similar transmission powers or the same transmission power may transmit proximate in time to or at the same time as each other. Such proximity may not significantly increase crosstalk. During any particular time slot or slots, the $ONUs_{1-n}$ $165_{1-n}$ transmitting signals in different wavelength channels may have similar transmission powers or the same transmission power. Such transmission may also not significantly increase crosstalk.

Though the OLT 110 is described as performing the assignments, other PON 100 components may do so as well. The design of the PON 100, specifically the number of $ONUs_{1-n}$ $165_{1-n}$ may determine how many time slots are available. The design of the $ONUs_{1-n}$ $165_{1-n}$, specifically the design of the $transmitters_{1-n}$ $185_{1-n}$, may determine the transmission powers.

Figure 7:
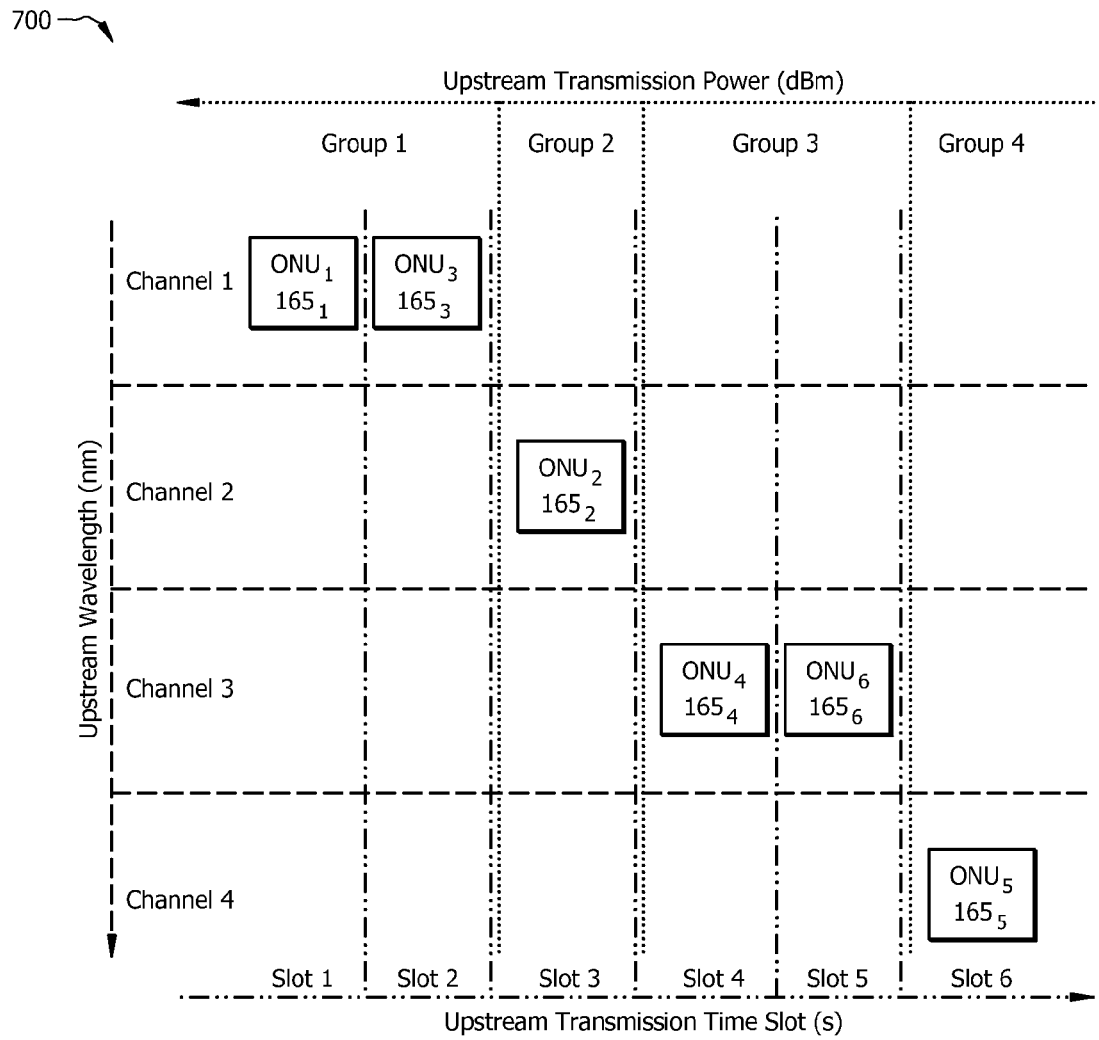
FIG. 7 is a diagram illustrating a scheme for upstream transmission allocation according to yet another embodiment of the disclosure.

FIG. 7 is a diagram illustrating a scheme 700 for upstream transmission allocation according to yet another embodiment of the disclosure. The scheme 700 may demonstrate WDMA and TDMA. The scheme 700 may show six $ONUs_{1-n}$ $165_{1-n}$, $ONUs_{1-6}$ $165_{1-6}$, grouped into four groups, groups 1-4, according to upstream transmission power. In that case, n is 6 and m is 4. Each group of $ONUs_{1-6}$ $165_{1-6}$ may be assigned an upstream wavelength associated with one of four wavelength channels, channels 1-4. Each group of $ONUs_{1-6}$ $165_{1-6}$ may also be assigned an upstream transmission time slot associated with one of six time slots, slots 1-6. The upstream transmission powers are in dBm and increase to the left horizontally. The upstream wavelengths are in nanometers and increase to the bottom vertically. The upstream transmission time slots are in seconds (s) and increase the right horizontally. The scheme 700 may assign a shortest-length wavelength to the $ONU_{1-n}$ $165_{1-n}$ group with the strongest transmission powers, a longest-length wavelength to the $ONU_{1-n}$ $165_{1-n}$ group with the weakest transmission powers, and so forth. In addition, the scheme may assign a first time slot to the $ONU_{1-n}$ $165_{1-n}$ with the strongest transmission power, a last time slot to the $ONU_{1-n}$ $165_{1-n}$ with the weakest transmission power, and so forth.

As shown, the $ONUs_{1,3}$ $165_{1,3}$ comprising group 1 may have the strongest transmission powers and may therefore be assigned a first wavelength channel that may correspond to the shortest-length wavelength available. The $ONU_2$ $165_2$ comprising group 2 may have the second-strongest transmission power and may therefore be assigned a second wavelength channel that may correspond to the second-shortest-length wavelength available. The $ONUs_{4,6}$ $165_{4,6}$ comprising group 3 may have the third-strongest transmission powers and may therefore be assigned a third wavelength channel that may correspond to the third-shortest-length wavelength available. Finally, the $ONU_5$ $165_5$ comprising group 4 may have the weakest transmission powers and may therefore be assigned a fourth wavelength channel that may correspond to the longest-length wavelength available. Because the $ONUs_{1,3}$ $165_{1,3}$ with the strongest transmission powers transmit in the first wavelength channel and the $ONU_5$ $165_5$ with the weakest transmission power transmits in the fourth wavelength channel, which is farthest from the first wavelength channel, crosstalk among the $ONUs_{1-6}$ $165_{1-6}$ may be reduced.

As further shown, the $ONUs_{1,3}$ $165_{1,3}$ may have the strongest transmission powers and may therefore be assigned a first time slot and a second time slot. The $ONU_2$ $165_2$ may have the second strongest transmission power and may therefore be assigned a third time slot. The $ONUs_{4,6}$ $165_{4,6}$ may have the third strongest transmission powers and may therefore be assigned a fourth time slot and a fifth time slot. Finally, the $ONU_5$ $165_5$ may have the weakest transmission power and may therefore be assigned a sixth time slot. Furthermore, because the $ONU_1$ $165_1$ and the $ONU_3$ $165_3$ are both assigned the first wavelength channel, they may not transmit at the same time. Accordingly, the $ONU_1$ $165_1$ may transmit during the first time slot, and the $ONU_3$ $165_3$ may transmit during the second time slot. Similarly, because the $ONU_4$ $165_4$ and the $ONU_6$ $165_6$ are both assigned the third wavelength channel, they may not transmit at the same time. Accordingly, the $ONU_4$ $165_4$ may transmit during the fourth time slot, and the $ONU_6$ $165_6$ may transmit during the fifth time slot. Because the $ONUs_{1,3}$ $165_{1,3}$ with the strongest transmission powers transmit in the first two time slots and the $ONU_5$ $165_5$ with the weakest transmission power transmits in the sixth time slot, which is farthest from the first two time slots, crosstalk among the $ONUs_{1-6}$ $165_{1-6}$ may be further reduced.

Alternatively, the scheme 700 may assign a shortest wavelength to the $ONU_{1-n}$ $165_{1-n}$ group with the weakest transmission powers, a longest wavelength to the $ONU_{1-n}$ $165_{1-n}$ group with the strongest transmission powers, and so forth. Alternatively, the scheme 700 may also assign a first time slot to the $ONU_{1-n}$ $165_{1-n}$ group with the weakest transmission powers, a last time slot to the $ONU_{1-n}$ $165_{1-n}$ group with the strongest transmission power, and so forth. Alternatively, the scheme 700 may also assign idle wavelength channels. Alternatively, the scheme 700 may assign any other suitable combination of WDMA and TDMA. The choice of which scheme to employ is arbitrary and may be determined based on design choice.

Figure 8:
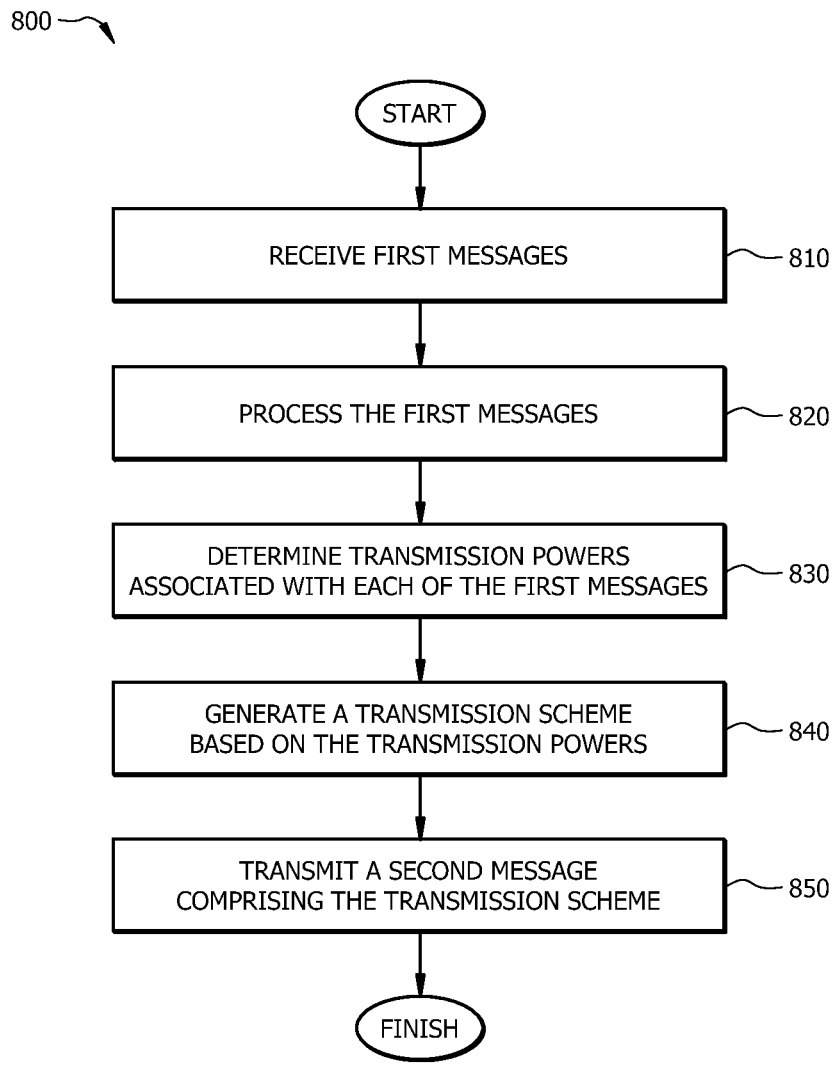
FIG. 8 is a flowchart illustrating a method of transmission allocation according to an embodiment of the disclosure.

FIG. 8 is a flowchart illustrating a method 800 of transmission allocation according to an embodiment of the disclosure. The method 800 may be implemented in the OLT 110. At step 810, first messages may be received. For instance, the first messages may be registration messages that the OLT 110 receives from the $ONUs_{1-n}$ $165_{1-n}$. The first messages may be received at any time. For instance, the $ONUs_{1-n}$ $165_{1-n}$ may initialize and therefore send their respective registration messages at different times. At step 820, the first messages may be processed. At step 830, transmission powers associated with each of the first messages may be determined. For instance, the $ONUs_{1-n}$ $165_{1-n}$ may explicitly indicate their transmission powers in registration messages or the OLT 110 may determine the transmission powers based on its own calculation. At step 840, a transmission scheme based on the transmission powers may be generated. The transmission scheme may be any one of the transmission schemes described above and shown in FIGS. 4-7. For instance, the transmission scheme may assign either wavelengths or a combination of wavelengths and time slots to the ONUs$_{1-n}$ 165$_{1-n}$. At step 850, a second message comprising the transmission scheme may be transmitted. For instance, the second message may be a transmission allocation that the OLT 110 transmits to the ONUs$_{1-n}$ 165$_{1-n}$.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$ and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a receiver configured to receive first messages;
    a processor coupled to the receiver and configured to:
        process the first messages,
        determine transmission powers associated with the first messages, and
        generate a transmission scheme that assigns transmission wavelengths based on the transmission powers such that the transmission powers increase across a wavelength spectrum or decrease across the wavelength spectrum in a sequential order; and
    a transmitter coupled to the processor and configured to transmit a second message comprising the transmission scheme.

2. The apparatus of claim 1, wherein the transmission scheme associates a shortest-length wavelength in the wavelength spectrum with a strongest transmission power, a longest-length wavelength in the wavelength spectrum with a weakest transmission power, and a first intermediate-length wavelength in the wavelength spectrum with a first intermediate transmission power.

3. The apparatus of claim 2, wherein the transmission scheme associates a second intermediate-length wavelength in the wavelength spectrum with an idle wavelength channel.

4. The apparatus of claim 1, wherein the transmission scheme associates a shortest-length wavelength in the wavelength spectrum with a weakest transmission power, a longest-length wavelength in the wavelength spectrum with a strongest transmission power, and a first intermediate-length wavelength in the wavelength spectrum with a first intermediate transmission power.

5. The apparatus of claim 4, wherein the transmission scheme associates a second intermediate-length wavelength in the wavelength spectrum with an idle wavelength channel.

6. The apparatus of claim 1, wherein the transmission scheme assigns transmission time slots based on the transmission powers.

7. The apparatus of claim 6, wherein the transmission scheme associates a first time slot with a strongest transmission power and a second time slot with a weakest transmission power.

8. The apparatus of claim 6, wherein the transmission scheme associates a latest time slot with a strongest transmission power, an earliest time slot with a weakest transmission power, and a first intermediate time slot with a first intermediate transmission power.

9. The apparatus of claim 1, wherein the second message is a media access control (MAC) message instructing a physical layer to implement the transmission scheme.

10. The apparatus of claim 1, wherein the apparatus is an optical line terminal (OLT).

11. The apparatus of claim 1, wherein the first messages are optical network unit (ONU) registration messages.

12. An apparatus comprising:
    a transmitter configured to transmit a first message at a first wavelength, wherein the first message comprises data that indicates a first transmission power of the apparatus for wavelength assignment;

a receiver configured to receive a second message, wherein the second message assigns to the apparatus a second wavelength based on the first transmission power such that the transmission powers increase across a wavelength spectrum or decrease across the wavelength spectrum in a sequential order; and a processor coupled to the transmitter and the receiver and configured to:

process the second message, and instruct the transmitter to transmit a third message at the second wavelength.

13. The apparatus of claim 12, wherein the second message further assigns to the apparatus a time slot based on the first transmission power.

14. The apparatus of claim 12, wherein the apparatus is an optical network unit (ONU).

15. A method comprising:

receiving first messages;

processing the first messages;

determining transmission powers associated with each of the first messages;

generating a transmission scheme that assigns transmission wavelengths based on the transmission powers such that the transmission powers increase across a wavelength spectrum or decrease across the wavelength spectrum in a sequential order; and transmitting a second message comprising the transmission scheme.

16. The method of claim 15, wherein the transmission scheme assigns transmission wavelengths based on the transmission powers, and wherein the transmission scheme associates a shortest-length wavelength in the wavelength spectrum with a strongest transmission power, a longest-length wavelength in the wavelength spectrum with a weakest transmission power, and a first intermediate-length wavelength in the wavelength spectrum with a first intermediate transmission power.

17. The method of claim 16, wherein the transmission scheme assigns transmission time slots based on the transmission powers, and wherein the transmission scheme associates a first time slot with a strongest transmission power, a second time slot with a weakest transmission power, and a third time slot with a first intermediate transmission power.

18. The method of claim 15, wherein the transmission scheme separates the transmission powers into groups comprising a first group associated with a strongest transmission power, a second group associated with a weakest transmission power, and additional groups associated with intermediate transmission powers, wherein the transmission scheme assigns a greatest wavelength separation between the first group and the second group, and wherein the transmission scheme assigns less than the greatest wavelength separation among the additional groups.

19. The method of claim 18, wherein the transmission scheme assigns a temporal separation between the first group and the second group.

\* \* \* \* \*